United States Patent
Utsugi et al.

(10) Patent No.: US 7,945,091 B2
(45) Date of Patent: May 17, 2011

(54) IMAGE PROCESSOR CORRECTING COLOR MISREGISTRATION, IMAGE PROCESSING PROGRAM, IMAGE PROCESSING METHOD, AND ELECTRONIC CAMERA

(75) Inventors: Akihiko Utsugi, Machida (JP); Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 943 days.

(21) Appl. No.: 11/884,455

(22) PCT Filed: Mar. 3, 2006

(86) PCT No.: PCT/JP2006/304079
§ 371 (c)(1),
(2), (4) Date: Aug. 16, 2007

(87) PCT Pub. No.: WO2006/093266
PCT Pub. Date: Sep. 8, 2006

(65) Prior Publication Data
US 2009/0207271 A1 Aug. 20, 2009

(30) Foreign Application Priority Data
Mar. 4, 2005 (JP) .................. 2005-061015

(51) Int. Cl.
*G06K 9/00* (2006.01)

(52) U.S. Cl. ..................................... 382/162

(58) Field of Classification Search .................. 382/162, 382/167; 399/231, 297, 298, 299, 301, 306; 396/225; 348/223.1; 358/1.9, 2.1, 300, 500, 358/501
See application file for complete search history.

(56) References Cited

U.S. PATENT DOCUMENTS

| 5,157,481 | A | 10/1992 | Kashimura et al. |
| 6,246,857 | B1 * | 6/2001 | Tanaka ..................... 399/301 |
| 6,885,841 | B2 * | 4/2005 | Harada et al. ............... 399/301 |
| 2002/0001409 | A1 | 1/2002 | Chen et al. |

FOREIGN PATENT DOCUMENTS

| JP | B2 2552742 | 8/1996 |
| JP | A 2000-299874 | 10/2000 |
| JP | A 2001-186533 | 7/2001 |
| JP | A 2001-245314 | 9/2001 |
| JP | A 2002-112276 | 4/2002 |
| JP | A 2004-153323 | 5/2004 |

\* cited by examiner

*Primary Examiner* — Jose L Couso
(74) *Attorney, Agent, or Firm* — Oliff & Berridge, PLC

(57) ABSTRACT

An image processor captures image data which include at least correction object color components and reference color components and has one kind of color component per pixel. The image processor acquires or detects information about positional shifts of the correction object color components and corrects positional shifts of correction object color components. In this correction, image structures lost from correction object color components are compensated for by image structures extracted from reference color components.

21 Claims, 11 Drawing Sheets

IMAGE PROCESSOR CORRECTING COLOR MISREGISTRATION, IMAGE PROCESSING PROGRAM, IMAGE PROCESSING METHOD, AND ELECTRONIC CAMERA

CROSS REFERENCE TO RELATED APPLICATION

This application is a U.S. National Stage application claiming the benefit of the prior filed International Application Number PCT/JP2006/304079, filed Mar. 3, 2006, in which the International Application claims a priority date of Mar. 4, 2005 based on prior filed Japanese Application Number 2005-061015 the entire contents of which are incorporated herein by reference.

TECHNICAL FIELD

The present invention relates to an image processing technology for suppressing magnification chromatic aberration of an image.

BACKGROUND ART

In general, it is known that in an electronic camera, color misregistration occurs on a captured image due to magnification chromatic aberration of an imaging optical system. Some technologies for correcting such color misregistration by image processing have been proposed up to now.

For example, in Patent Document 1, when lost color components of raw data are produced by color interpolation, magnification chromatic aberration is corrected at the same time by manipulating an interpolation coefficient.

Furthermore, for example, in Patent Document 2, a method of compensating for sharpness lost by correction of color misregistration is disclosed. In this method, interpolation coefficient data which represent the amounts of misregistration of correction object color components (e.g. R and B components) are obtained first. Next, a complementary coefficient of the interpolation coefficient data is obtained, and reference color components (e.g. G components) are multiplied by the complementary coefficient. The result of the multiplication is added to the correction object color components to compensate for the sharpness lost.

Furthermore, for example, in Patent Document 3, a method of producing color misregistration corrected color difference components (R-G) and (B-G) by scaling the G components of raw data in accordance with the magnification chromatic aberration of the R and B components and subtracting the scaled G components from the R and B components is disclosed. In this method, a suitable correction is made particularly in an achromatic image area.

In this specification, "raw data" correspond to "image data having one kind of color components per pixel" in the Claims.

Patent Document 1: Japanese Unexamined Patent Application Publication No. 2001-186533 (Paragraph 0043)
Patent Document 2: Japanese Patent Publication No. 2552742
Patent Document 3: Japanese Unexamined Patent Application Publication No. 2002-112276

DISCLOSURE OF THE INVENTION

Problems to be Solved by the Invention

In Patent Document 1 described above, interpolation for correction of magnification chromatic aberration is performed also for color components originally included in raw data. For example, when raw data having a typical Bayer array including R, G, and B color components is used, interpolation is performed for R and B color components in the raw data.

However, the number of pixels of R or B color components in the raw data of an image is only one-quarter the number of pixels of the entire image, and the pixel density of the R or B color components is thus relatively low. For this reason, if magnification chromatic aberration correction (simple interpolation) is performed for the R and B color components the pixel densities of which are low without being processed, the fine structures of the R and B color components are quickly lost.

On the other hand, in Patent Document 2, G components are multiplied by complementary coefficients of R or B positions, so that the G components must be in the pixel positions of the R or B components. For this reason, this method can not be applied immediately to raw data having a Bayer array or the like.

Furthermore, in Patent Document 3, G components are scaled in accordance with R and B components shifted due to magnification chromatic aberration. For this reason, produced color difference components (R-G) and (B-G) are shifted in pixel position from the original G components. For this reason, in an image area having a chromatic color structure, positional shifts between the G components and the color difference components can not be neglected, so that the magnification chromatic aberration can not be corrected accurately. In addition, there is a risk that the chromatic color structure is destroyed by the influence of the positional shifts.

From the reasons stated above, it has been difficult for the conventional technologies described above to correct, with high quality, magnification chromatic aberration for raw data.

It is therefore an object of the present invention to correct, with high quality, magnification chromatic aberration for raw data.

Means for Solving the Problems

<<1>> An image processor of the present invention includes an input unit, a color misregistration information acquisition unit, and a color misregistration suppression unit.

The input unit captures an image which is represented by two or more kinds of color components including at least correction object color components and reference color components and which has one kind of color components per pixel.

The color misregistration information acquisition unit acquires or detects information about positional shifts of the correction object color components.

The color misregistration suppression unit corrects positional shifts of the correction object color components on the basis of the information about positional shifts.

The color misregistration suppression unit includes a positional shift correction unit, an image structure extraction unit, and an image structure compensation unit.

The positional shift correction unit corrects the positional shifts of the correction object color components on the basis of the information about positional shifts.

The image structure extraction unit extracts image structures from the reference color components.

The image structure compensation unit compensates for image structures lost from the correction object color components due to the positional shift correction with image structures of the reference color components extracted by the image structure extraction unit.

<<2>> The image structure extraction unit preferably uses color components of higher pixel density than the correction object color components as the reference color components.

<<3>> The positional shift correction unit preferably obtains the correction object color components by interpolation with respect to positional shift destinations P' of pixel positions P of the correction object color components to use as correction object color components in the pixel positions P.

The image structure extraction unit obtains reference color components Z1 in the pixel positions P by interpolation. Furthermore, the image structure extraction unit produce reference color components Z2 in the pixel positions P by performing interpolation of reference spacing which is equivalent to pixel spacing which is referred in interpolation of the positional shift correction unit. The image structure extraction unit extracts a difference between interpolation results Z1 and Z2 obtained in such a manner.

On the other hand, the image structure compensation unit adds the difference between interpolation results Z1 and Z2 obtained by the image structure extraction unit to the correction object color components in which positional shifts have been corrected by the positional shift correction unit.

<<4>> The image structure extraction unit preferably obtains original positions Q before occurrence of the positional shifts with respect to the correction object color components used for interpolation of the positional shift destinations P'. The image structure extraction unit interpolates reference color components in the original positions Q, and obtain the reference color components Z2 in the pixel positions P.

<<5>> Another image processor of the present invention includes an input unit, a color misregistration information acquisition unit, and a color misregistration suppression unit.

The input unit captures an image which is represented by two or more kinds of color components including at least correction object color components and reference color components and in which at least one kind of correction object color components per pixel has been lost.

The color misregistration information acquisition unit acquires or detects information about positional shifts of the correction object color components.

The color misregistration suppression unit corrects positional shifts of the correction object color components on the basis of the information about positional shifts.

The color misregistration suppression unit includes a reference color component positional shift unit, a color difference calculation unit, and a color difference positional shift correction unit.

The reference color component positional shift unit shifts positions of the reference color components in agreement with positional shifts of the correction object color components on the basis of the information about positional shifts.

The color difference calculation unit obtains color differences which have been shifted in position on the basis of the reference color components which have been shifted in position by the reference color component positional shift unit and the correction object color components.

The color difference positional shift correction unit corrects positional shifts of the color differences on the basis of the information about positional shifts.

<<6>> The color difference positional shift correction unit preferably corrects positional shifts of color differences in agreement with pixel positions of the reference color components which have not been shifted by the reference color component positional shift unit.

<<7>> Another image processor of the present invention includes an input unit, a color misregistration information acquisition unit, and a color misregistration suppression unit.

The input unit captures an image which is represented by two or more kinds of color components including at least correction object color components and reference color components and in which at least one kind of correction object color components per pixel has been lost.

The color misregistration information acquisition unit acquires or detects information about positional shifts of the correction object color components.

The color misregistration suppression unit corrects positional shifts of the correction object color components on the basis of the information about positional shifts.

The color misregistration suppression unit includes a reference color component interpolation unit, a color difference calculation unit, and a color difference interpolation unit.

The reference color component interpolation unit obtains original positions P''' before occurrence of the positional shifts with respect to pixel positions P of the correction object color components on the basis of the information about positional shifts. Furthermore, the reference color component interpolation unit produces reference color components in the original positions P''' by interpolation.

The color difference calculation unit obtains color difference components C'' in the original positions P''' from correction object color components in the pixel positions P and reference color components in the original positions P'''.

The color difference interpolation unit obtaining at least color difference components C in pixel positions P by interpolates color difference components C'' in the original positions P'''.

<<8>> The color misregistration suppression unit preferably produces reference color components in pixel positions P by interpolation. Furthermore, the color misregistration suppression unit includes a correction object color component production unit producing correction object color components in pixel positions P on the basis of reference color components and color difference components C in pixel positions P.

<<9>> The color misregistration suppression unit interpolates color difference components C'' in the original positions P''', obtains color difference components C for pixel positions of reference color components. Furthermore, color misregistration suppression unit produces correction object color components for pixel positions of reference color components on the basis of color difference components C and reference color components.

<<10>> Another image processor of the present invention includes an input unit, a color misregistration information acquisition unit, and a color misregistration suppression unit.

The input unit captures an image which is represented by two or more kinds of color components including at least correction object color components and reference color components and which has one kind of color components per pixel.

The color misregistration information acquisition unit acquires or detects information about positional shifts of the correction object color components.

The color misregistration suppression unit corrects positional shifts of the correction object color components on the basis of the information about positional shifts.

The color misregistration suppression unit corrects color misregistration of the correction object color components on the basis of the reference color components and the correction object color components. Furthermore, the color misregistration suppression unit produces image data in which correction object color components in which color misregistration has been corrected and the reference color components are arranged in pixels and one kind of color component is arranged per pixel.

<<11>> An image processing program of the present invention is a program for allowing a computer to function as an image processor according to any one of claims 1 to 10.

<<12>> An electronic camera of the present invention includes an image processor according to any one of claims 1 to 10 and an image-capturing unit capturing an image of a subject and producing image data in which each pixel has one color component.

In the above configuration, the image processor processes the image data produced by the image-capturing unit to correct color misregistration.

<<13>> An image processing method of the present invention is an image processing method performing the same image processing as that in <<1>>.

<<14>> Another image processing method of the present invention is an image processing method performing the same image processing as that in <<7>>.

Effect of the Invention

In positional shift correction of correction object color components of image data including pixels in which at least one color component has been lost, the present invention refers to other components (reference color components). Thus, even if the pixel density of the correction object color components is low, pixel spacing which is referred to in the positional shift correction can be made substantially close by referring to the reference color components. By making pixel spacing close and performing positional shift correction like this, positional shift correction by which fine structures of an image are well remained become possible.

Consequently, by a technology of the present invention, high quality correction of magnification chromatic aberration by which few fine structures are lost is realized.

The above object and other objects of the present invention can be easily confirmed by the following description and the appended drawings.

BRIEF DESCRIPTION OF THE DRAWINGS

The nature, principle, and utility will become more apparent from the following detailed description when read in conjunction with the accompanying drawings in which like parts are designated by identical reference numbers, in which.

BEST MODE FOR CARRYING OUT THE INVENTION

First Embodiment

Configuration of First Embodiment

Figure 1:
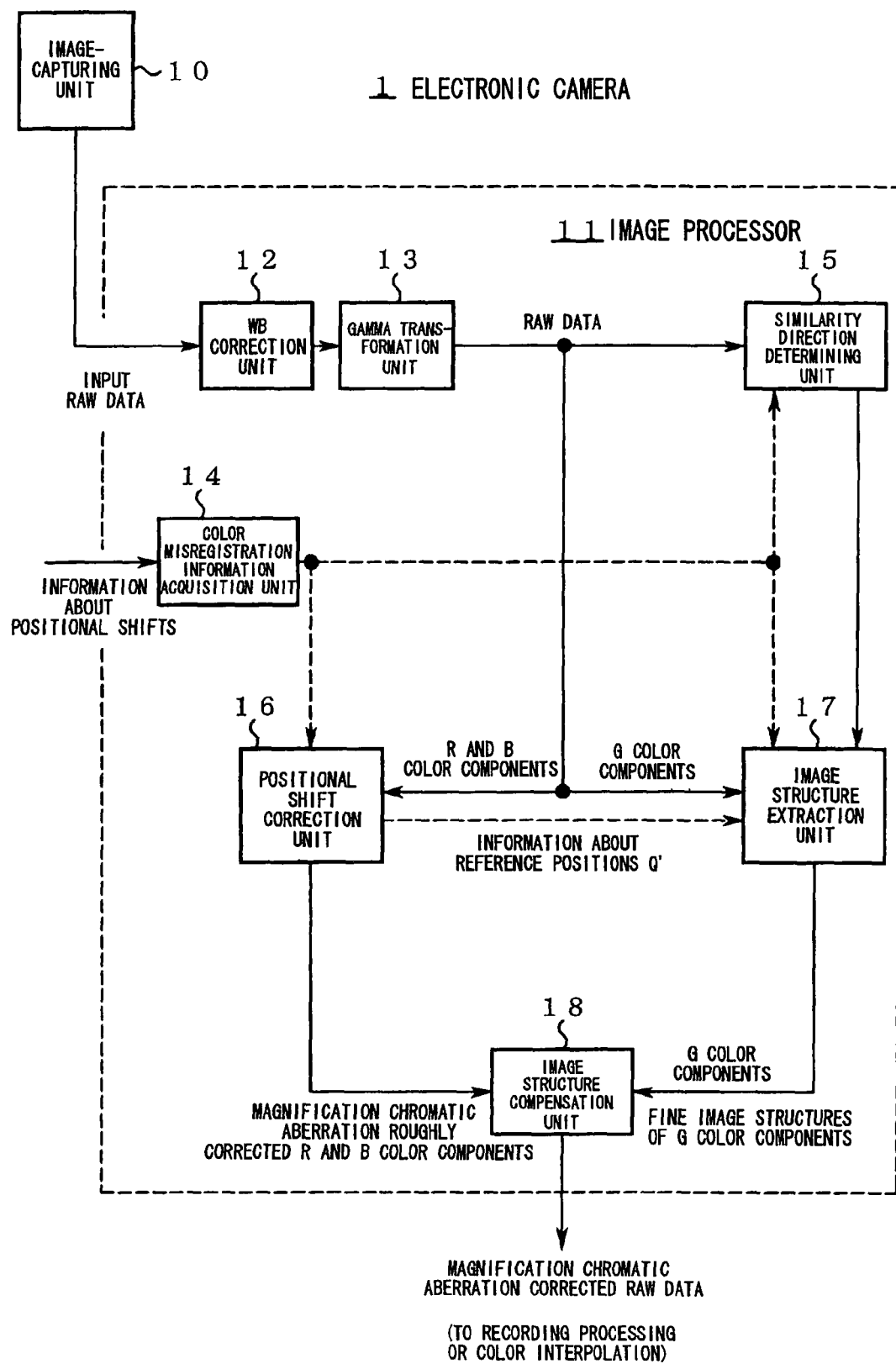
FIG. 1 is a block diagram showing the structure of the first embodiment.

FIG. 1 is a block diagram showing the structure of the first embodiment.

In FIG. 1, the electronic camera 1 includes an image-capturing unit 10 and an image processor 11. The image-capturing unit 10 captures an image of a subject through an imaging optical system (not shown in the figure), and produces raw data of the image. The raw data is image data having a Bayer array including R, G, and B color components. The image processor 11 corrects the magnification chromatic aberration of the raw data, and outputs corrected raw data.

The image processor 11 includes the following.

(1) A WB correction unit 12 performing white balance adjustment processing for the raw data.

(2) A gamma transformation unit 13 performing gamma transformation for the raw data.

(3) A color misregistration information acquisition unit 14 acquiring or detecting positional shift information (differences between image magnifications of color components, data showing a distribution in the screen of positional shifts, and the like) caused by the magnification chromatic aberration.

(4) A similarity direction determining unit 15 determining local similarity directions of an image structure. The similarity direction determining unit 15 may determine similarity directions in consideration of positional shifts of the magnification chromatic aberration by a method described in International Publication WO 03/058554 pamphlet. The similarity direction determining unit 15 may also determine similarity directions simply only between the same color components. For example, similarity directions of only G color components may be determined without influence of the magnification chromatic aberration.

(5) A positional shift correction unit 16 performing simple positional shift correction by interpolation with respect to the R and B color components in the raw data to output R and B color components in which the magnification chromatic aberration has been roughly corrected.

(6) An image structure extraction unit 17 extracting a fine image structure from the G color components of high pixel density instead of an image structure lost by the positional shift correction unit 16.

(7) A image structure compensation unit 18 compensating the fine image structure of the G color components extracted by the image structure extraction unit 17 with respect to the R and B color components in which the magnification chromatic aberration has been roughly corrected to produce R and B color components the fine structures of which are little lost.

Operation of First Embodiment

Figure 2:
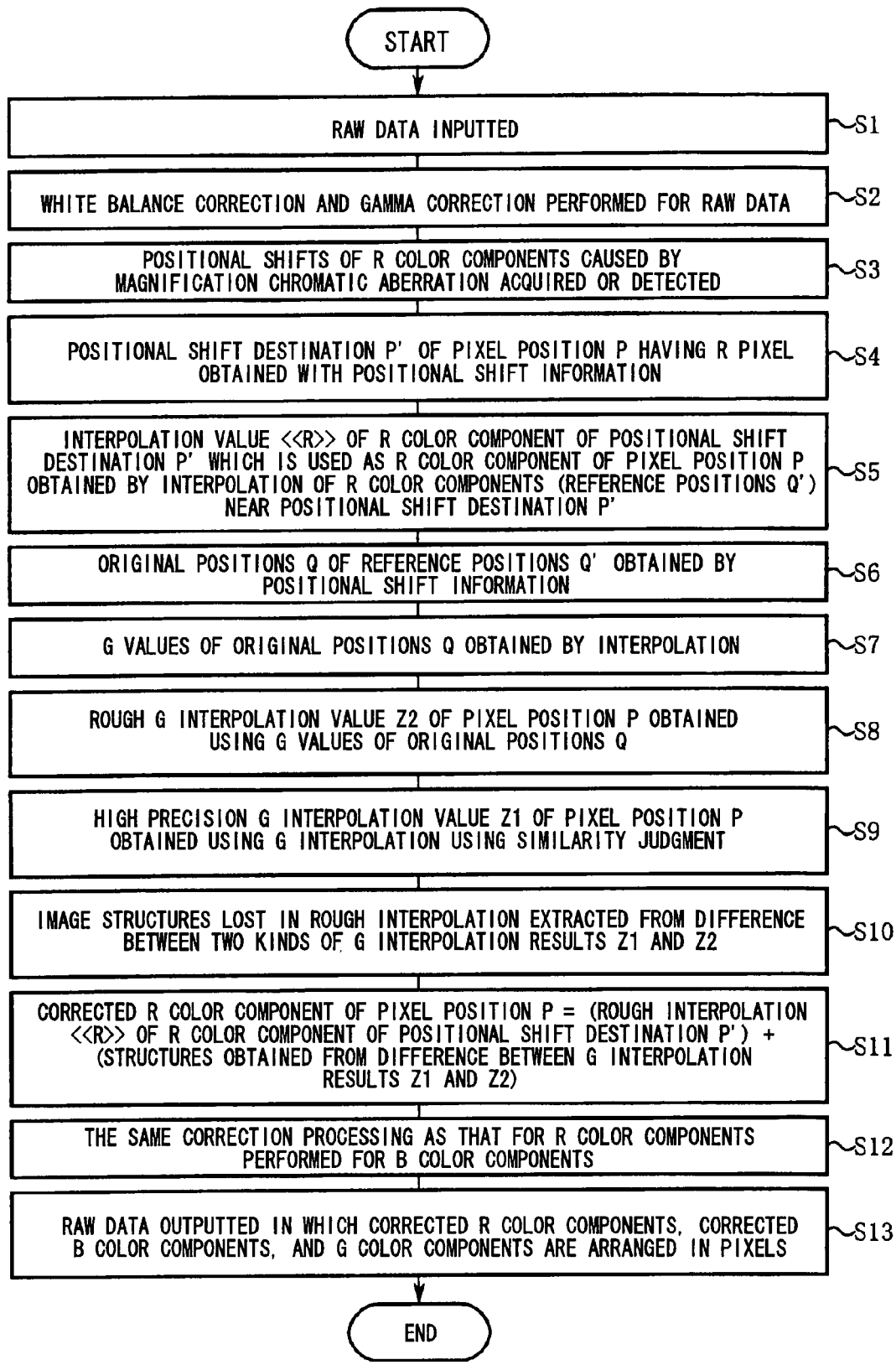
FIG. 2 is a flow chart showing the operation of the image processor 11.
Figure 3:
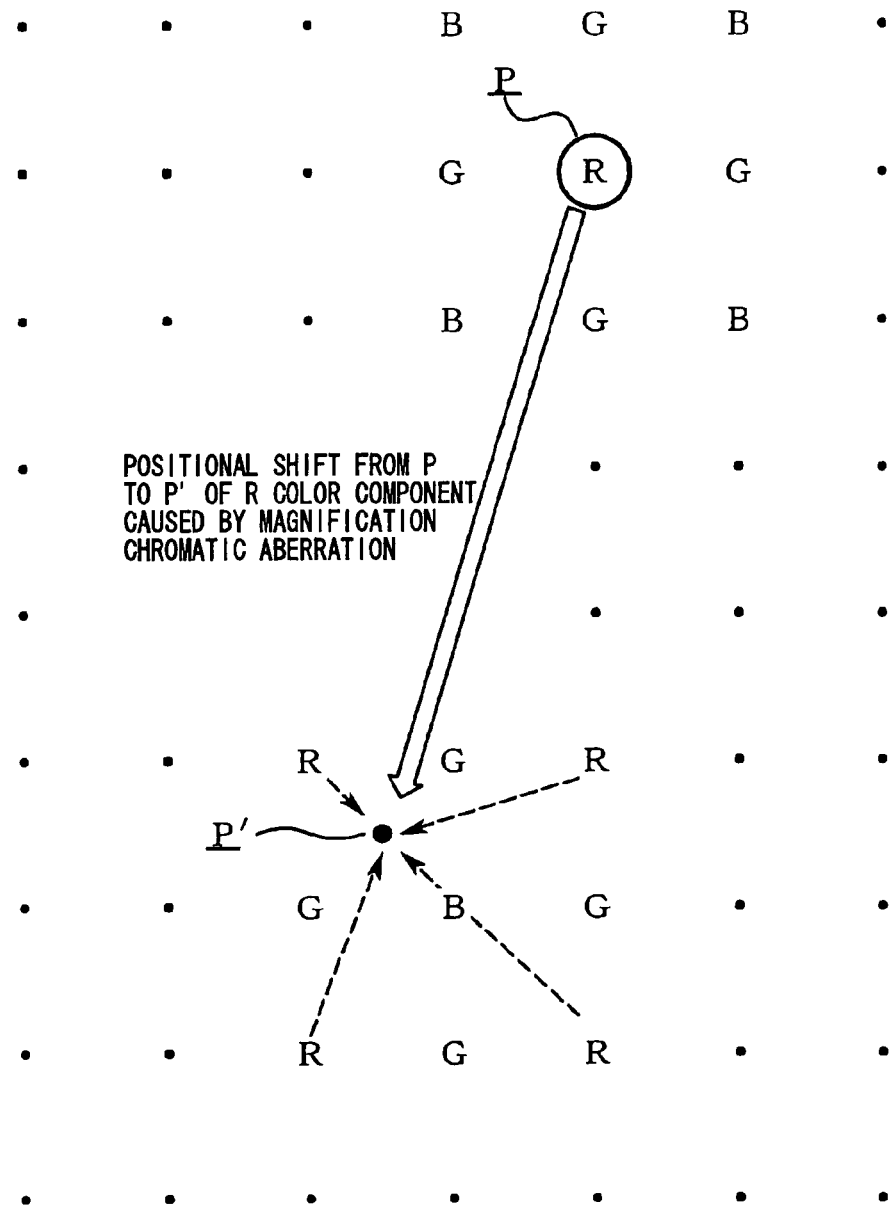
FIG. 3 shows R interpolation of a positional shift destination P'.

FIG. 2 is a flow chart showing the processing procedure of the image processor 11. The concrete operation of the first embodiment will be described below along the step numbers in FIG. 2.

Step S1: Raw data is input to the WB correction unit 12.

Step S2: The WB correction unit changes signal gains with respect to the R and B color components in the raw data, respectively, to adjust white balance. Usually, the white balance is adjusted in the direction of making the signal levels of the R, G, and B color components even. By this adjustment, signal levels extracted from the G color components at step S10 and signal levels lost from the R and B color components by the positional shift correction performed at step S5 can be made approximately even. Next, the gamma transformation unit 13 performs gamma correction for raw data obtained after the white balance adjustment.

Step S3: The color misregistration information acquisition unit 14 acquires or detects positional shift information of the R color components caused by the magnification chromatic aberration. For example, the color misregistration information acquisition unit 14 is able to acquire the positional shift information from the information obtained by communication with the imaging optical system and the imaging information accompanied with the raw data. The color misregistration information acquisition unit 14 is also able to detect the positional shift information by such as detecting widths of shift in edge position between color components from the raw data.

Step S4: The positional shift correction unit 16 obtains a positional shift destination P' of the magnification chromatic aberration with respect to a pixel position P in which an R color component is arranged in the raw data.

Step S5: The R color component at the positional shift destination P' is the very R color component which appears in the pixel position P in a condition that there is no magnification chromatic aberration. For this reason, the positional shift correction unit 16 interpolates R components near the positional shift destination P' to obtain an R interpolation value <<R>> of the positional shift destination P'. For interpolation performed at this step, a publicly known interpolation technology such as bicubic or linear interpolation can be used. The positional shift correction unit 16 outputs the R interpolation value <<R>> to the image structure compensation unit 18 as a simple correction value of the pixel position P.

Figure 4:
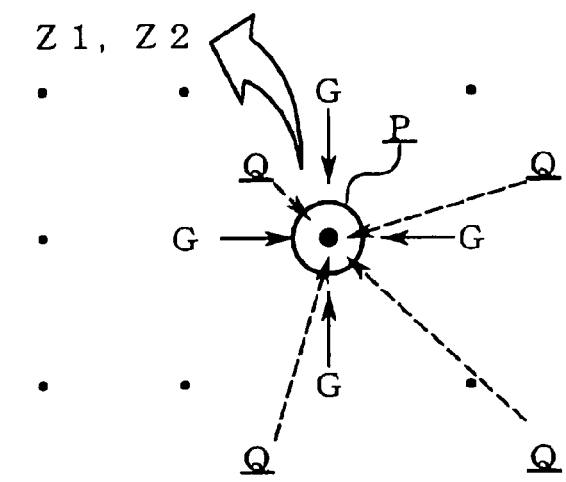
FIG. 4 depicts two kinds of G interpolation.
Figure 4:
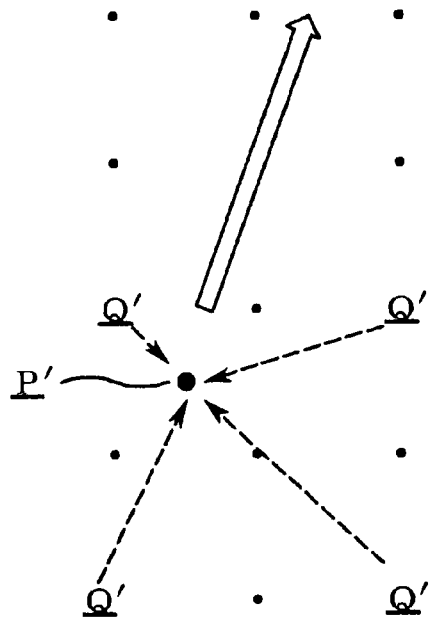

Step S6: The image structure extraction unit 17 obtains positions of R pixels (positions Q' shown in FIG. 4) near the positional shift destination P' which have been used at interpolation of the R interpolation value <<R>> from the positional shift correction unit 16. The image structure extraction unit 17 obtains positions (original positions Q shown in FIG. 4) before occurrence of positional shifts with respect to the R color components in the positions Q' by the positional shift information.

Step S7: R light and G light which should originally reach the same image positions on the imaging area are displaced by the magnification chromatic aberration, and the R light reaches the positions Q' and the G light reaches the original positions Q. Thus, an image structure shown with a group of R color components in the positions Q' and an image structure shown with a group of G color components in the positions Q should originally overlap each other in the same image positions. For this reason, the image structure extraction unit 17 performs interpolation using the G color components of high pixel density to obtain an interpolation value G for each of the original positions Q. For interpolation performed at this step, interpolation such as bicubic or linear interpolation, interpolation using the result of similarity judgment performed by the similarity direction determining unit 15, or the like is preferable.

Step S8: The image structure extraction unit 17 performs interpolation again using the interpolation values G of the original positions Q to obtain a G interpolation value Z2 of the pixel position P. The G interpolation value Z2 is the result of interpolation roughly performed on the same condition (reference spacing and image structure in the same image positions) as the R interpolation value <<R>>.

Step S9: The image structure extraction unit 17 performs high precision G interpolation using similarity judgment to obtain a high precision G interpolation value Z1 of the pixel position P.

Step S10: The image structure extraction unit 17 extracts the image structure of the G color components lost in the rough G interpolation value Z2 from the difference between the results Z1 and Z2 of the two kinds of G interpolation. The difference at this step may be obtained by calculating the difference between Z1 and Z2, or may be a value corresponding to the ratio between Z1 and Z2.

Step S11: Many nature images have a tendency that the image structures of the color components are similar. Thus, the image structure obtained at step S10 is very similar to the image structure of the R color components lost from the R interpolation value <<R>>. For this reason, the image structure compensation unit 18 adds the difference between Z1 and Z2 obtained at step S10 to the R interpolation value <<R>> to produce corrected R color components. In the calculation performed at this step, the difference obtained at step S10 may be added to the R interpolation value <<R>> as it is. Furthermore, the difference obtained at step S10 is multiplied by a weighting factor for effect adjustment, and the result of the calculation may be added to the R interpolation value <<R>>. In addition, in order that an excess error does not occur, a limit (hard limit, soft limit such as a logarithmic curve, or the like) is put on the difference obtained at step S10, and the result of the limitation may be added to the R interpolation value <<R>>. Furthermore, instead of the addition, the difference obtained at step S10 may be multiplied by the R interpolation value <<R>>.

Step S12: The same processing as step S3 to S11 is performed on the B color components in the raw data to produce corrected B color components.

Step S13: The image structure compensation unit 18 output raw data in which corrected R color components, corrected B color components, and G color components are arranged in pixels.

Effect of First Embodiment, Etc.

Figure 5:
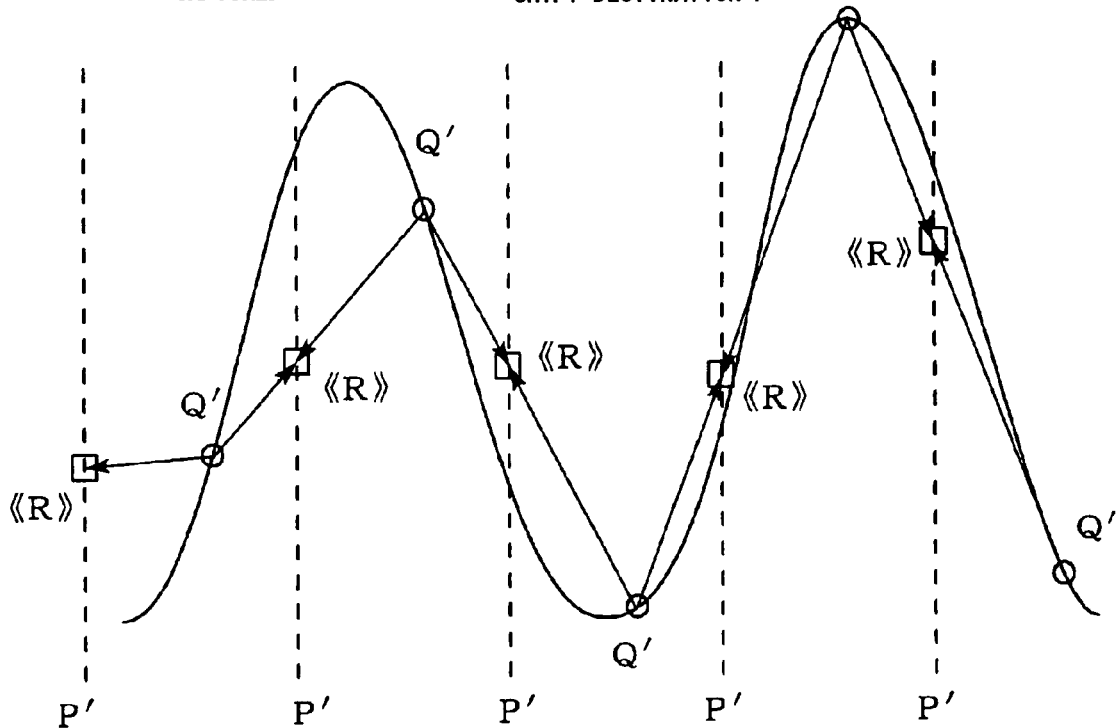
FIG. 5 depicts a manner that an R interpolation value <<R>> in which magnification chromatic aberration has been roughly corrected is obtained.
Figure 5:
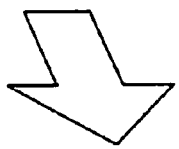
Figure 5:
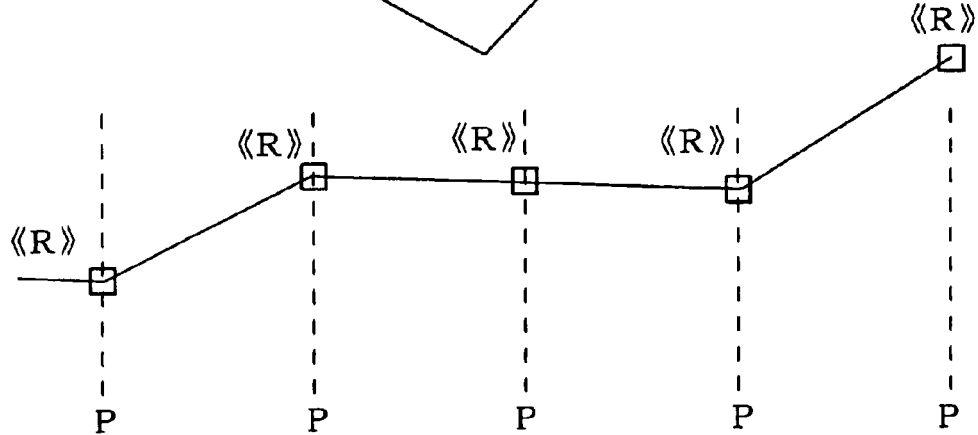

FIG. 5 depicts a manner that an R interpolation value <<R>> in which magnification chromatic aberration has been roughly corrected is obtained. In this processing, since the pixel density of the R color components is low, as shown in FIG. 5, most of the fine ups and downs are lost from the R interpolation value <<R>>.

Figure 6:
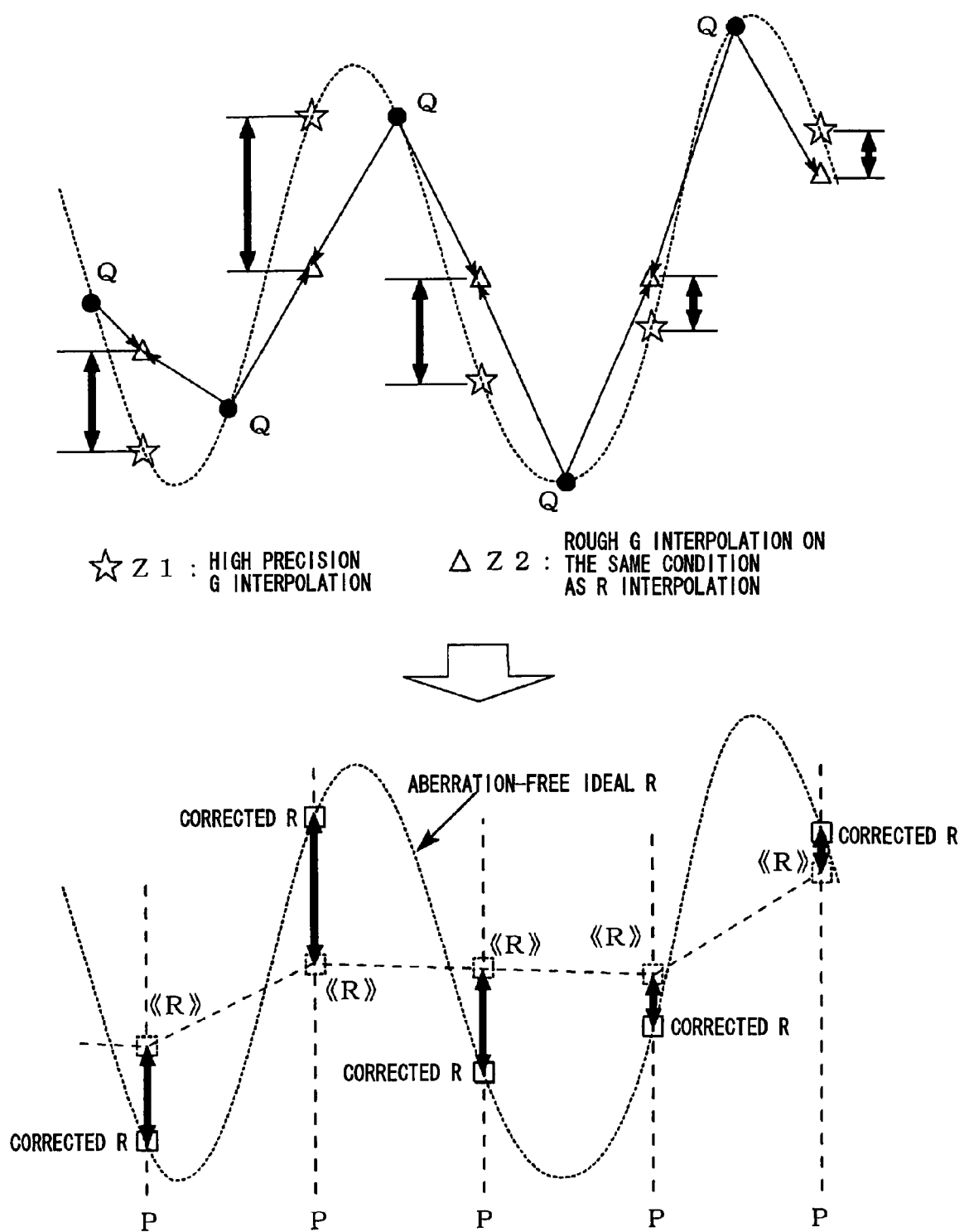
FIG. 6 depicts a manner that G interpolation values Z1 and Z2 are obtained from G color components.

FIG. 6 depicts a manner that G interpolation values Z1 and Z2 are obtained from G color components. The G interpolation value Z2 is a value calculated on the same condition (reference spacing and image structure) as the calculation of the R interpolation value <<R>>. For this reason, the G interpolation value Z2 and the R interpolation value <<R>> show a similar tendency. In particular, the G interpolation value Z2 and the R interpolation value <<R>> perform interpolation with the same reference spacing, so that they are similar in the manner of loosing high spatial frequency components. Furthermore, the G interpolation value Z2 and the R interpolation value <<R>> are produced by interpolating image structures which should originally overlap each other in the same position, thereby also being similar in the topological features of the ups and downs.

By the way, with regard to G color components, the density of pixels in the raw data is originally high, and it become possible that similarity judgment is taken into consideration. For this reason, in addition to the G interpolation value Z2 which is the result of rough interpolation, a high precision G interpolation value Z1 can be obtained.

Thus, local ups and downs lost in the process of calculating the G interpolation value Z2 can be obtained by obtaining the difference between the results Z1 and Z2 of the two kinds of interpolations. By these ups and downs, image structures lost in the process of calculating the R interpolation value <<R>> can be compensated. As a result, corrected R color components which well preserve the image structures while correcting the positional shifts caused by the magnification chromatic aberration can be obtained.

In addition, in the first embodiment, like processing is performed for the B color components to obtain corrected B color components. Such a correction of magnification chromatic aberration makes it possible that raw data which have no positional shifts caused by the magnification chromatic aberration and which well preserve image structures is produced.

Furthermore, depending on the kind of the imaging optical system, there may be a case that the magnification chromatic aberration is sufficiently small and is not required to be corrected. For this reason, it is preferable in the electronic camera 1 to be able to determine whether the magnification chromatic aberration is corrected or not with flexibility. In the first embodiment, the format of raw data to be handled remains the same regardless of whether the magnification chromatic aberration is corrected or not. For this reason, in the processing unit (not shown in the figures) in a later stage, the basic processing configuration is not required to be changed regardless of whether the magnification chromatic aberration is corrected or not. As a result, the whole circuit size can be reduced. Furthermore, it becomes possible to maintain the tendency of the whole image processing regardless of whether the magnification chromatic aberration is corrected or not.

In addition, color misregistration in a Nyquist frequency structure is also corrected accurately, so that mistakes in similarity judgment during color interpolation and interpolation value calculation errors can be reduced.

Next, another embodiment will be described.

Second Embodiment

Configuration of Second Embodiment

Figure 7:
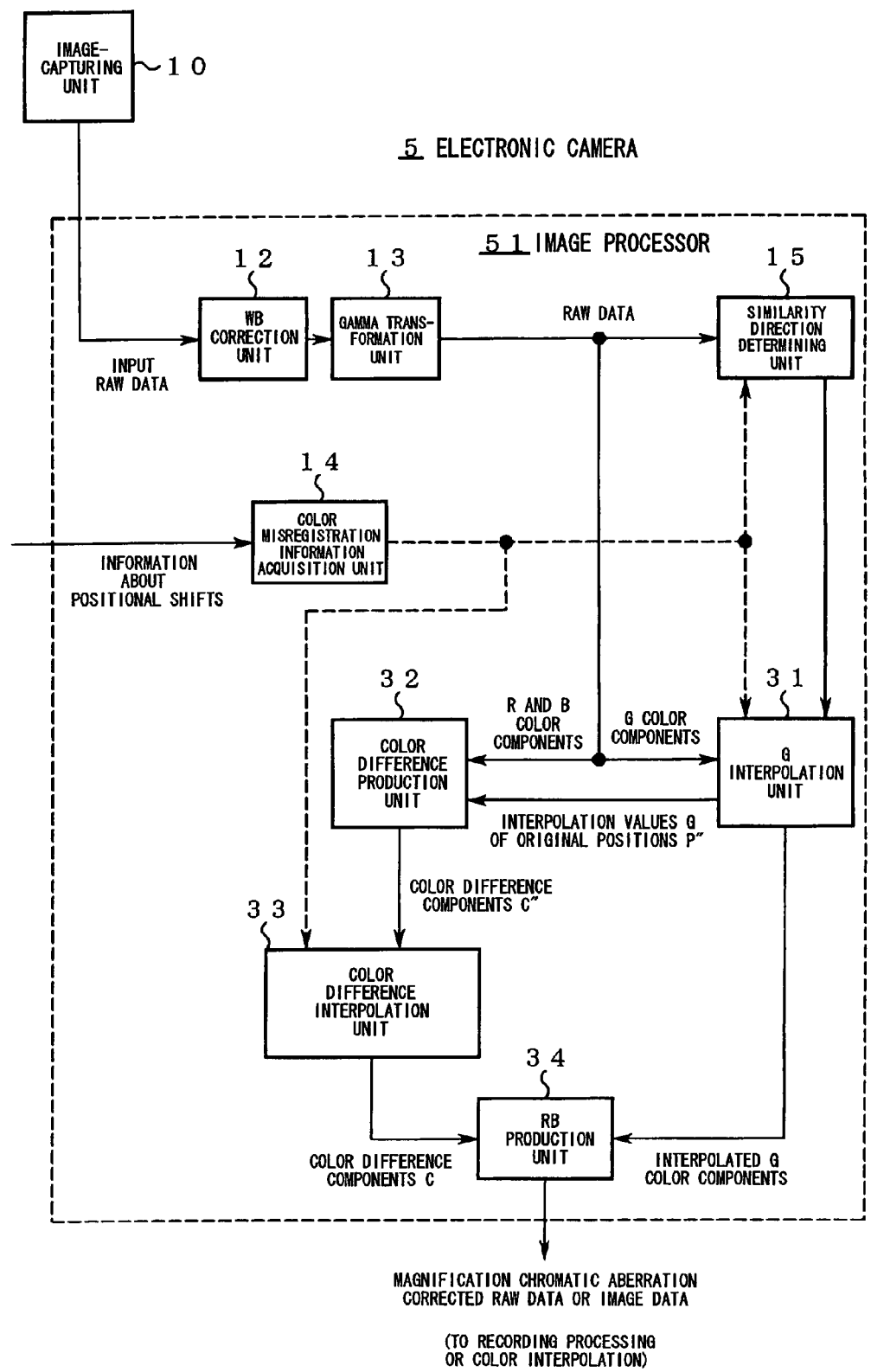
FIG. 7 is a block diagram showing the structure of the second embodiment.

FIG. 7 is a block diagram showing the structure of the second embodiment.

(1) A G interpolation unit 31 performing interpolation with respect to G color components in raw data.

(2) A color difference production unit 32 producing color difference components C'' from R (B) color components and interpolated G color components.

(3) A color difference interpolation unit 33 interpolating color difference components C'' to produce color difference components C in which positional shifts of magnification chromatic aberration have been corrected.

(4) An RB production unit 34 producing raw data or image data in which positional shifts of magnification chromatic aberration have been corrected from color difference components C and interpolated G color components.

Operation of Second Embodiment

Figure 8:
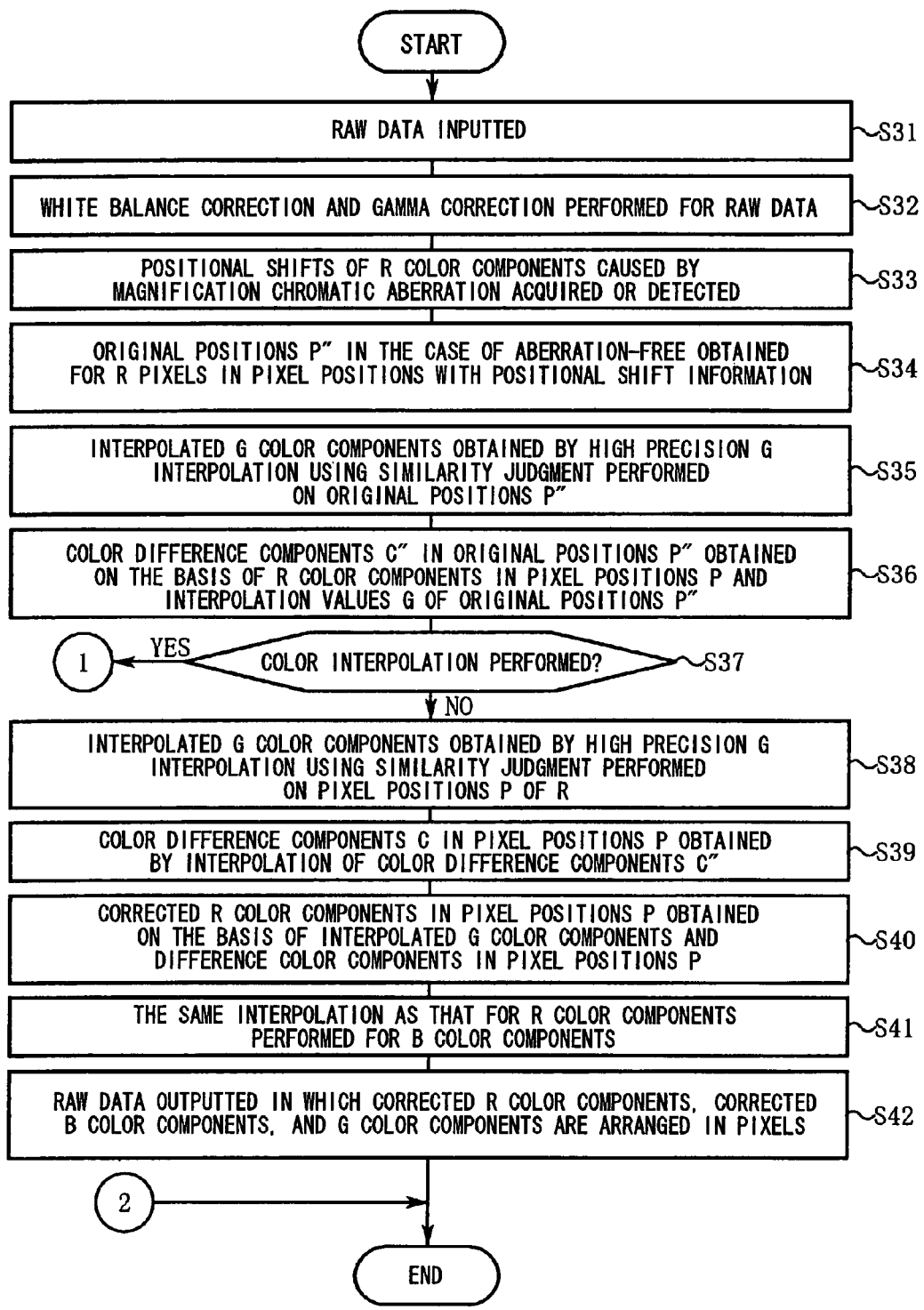
FIG. 8 is a flow chart (first half) depicting the operation of the image processor 51.
Figure 9:
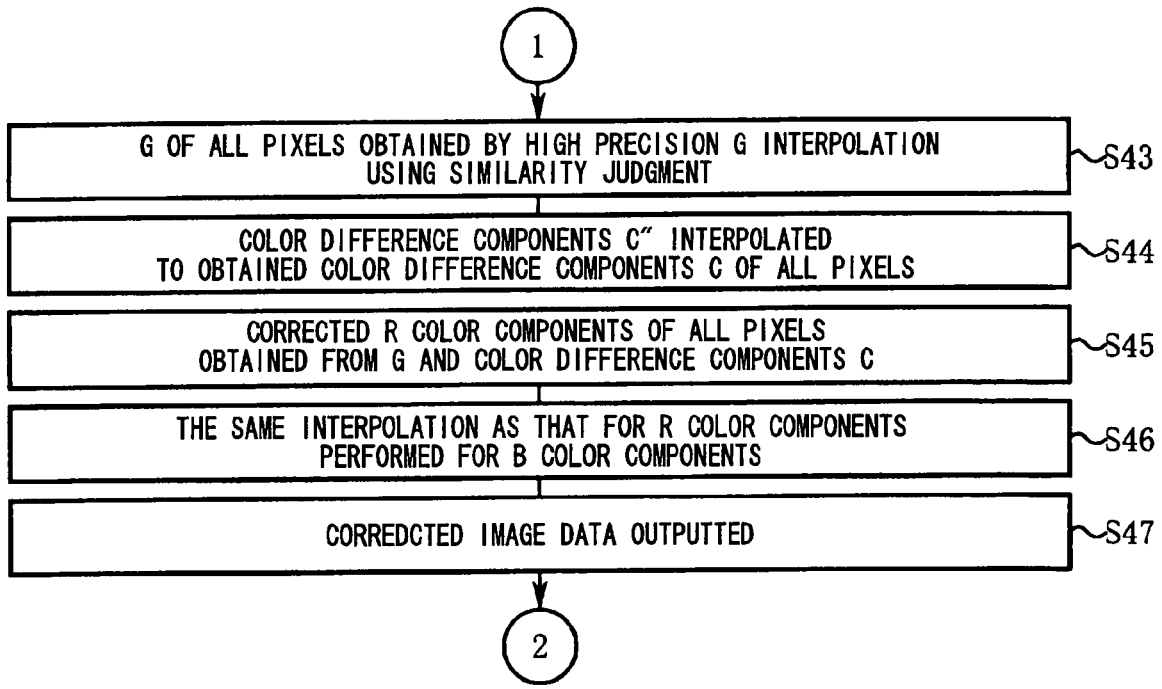
FIG. 9 is a flow chart (second half) depicting the operation of the image processor 51.

FIGS. 8 and 9 show a flow chart depicting the operation of the image processor 51.

The concrete operation of the second embodiment will be described below along the step numbers in FIGS. 8 and 9.

Steps S31 to S33: The same processing as steps S1 to S3 of the first embodiment is performed.

Figure 10:
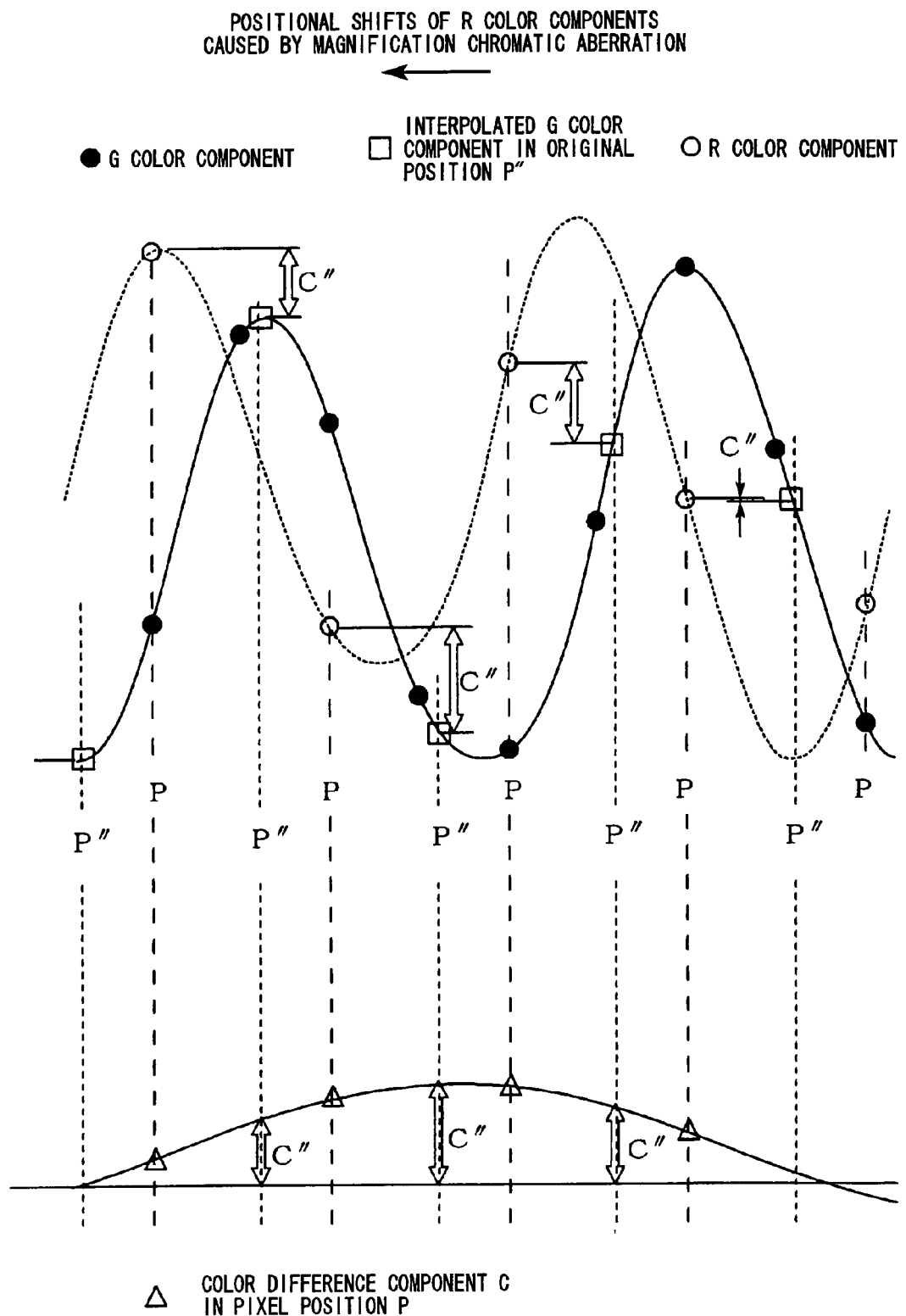
FIG. 10 depicts the processing of obtaining color difference components C" of original positions P"

Step S34: The G interpolation unit 31 obtains original positions P''' before positional shifts with respect to pixel positions P having R color components of raw data (see FIG. 10).

Step S35: The G interpolation unit 31 performs interpolation with respect to G color components of the raw data to obtain interpolated G color components in the original positions P'''. For interpolation performed at this step, a high precision interpolation using similarity judgment is preferable.

Step S36: The color difference production unit 32 obtains color difference components C''' from the R color components in the pixel positions P and the interpolated G color components in the original positions P''' (see FIG. 10). The color difference components C''' are color difference components which originally appear in the original positions P''' if there is no magnification chromatic aberration.

Step S37: The image processor 51 moves its operation to step S38 when performing magnification chromatic aberration correction only. On the other hand, the image processor 51 moves its operation to step S43 when performing color interpolation in parallel with the magnification chromatic aberration correction.

Step S38: The G interpolation unit 31 performs interpolation of the G color components to obtain interpolated G color components in the pixel positions P where the R color components are placed. For interpolation performed at this step, high precision interpolation using similarity judgment is preferable.

Figure 11:
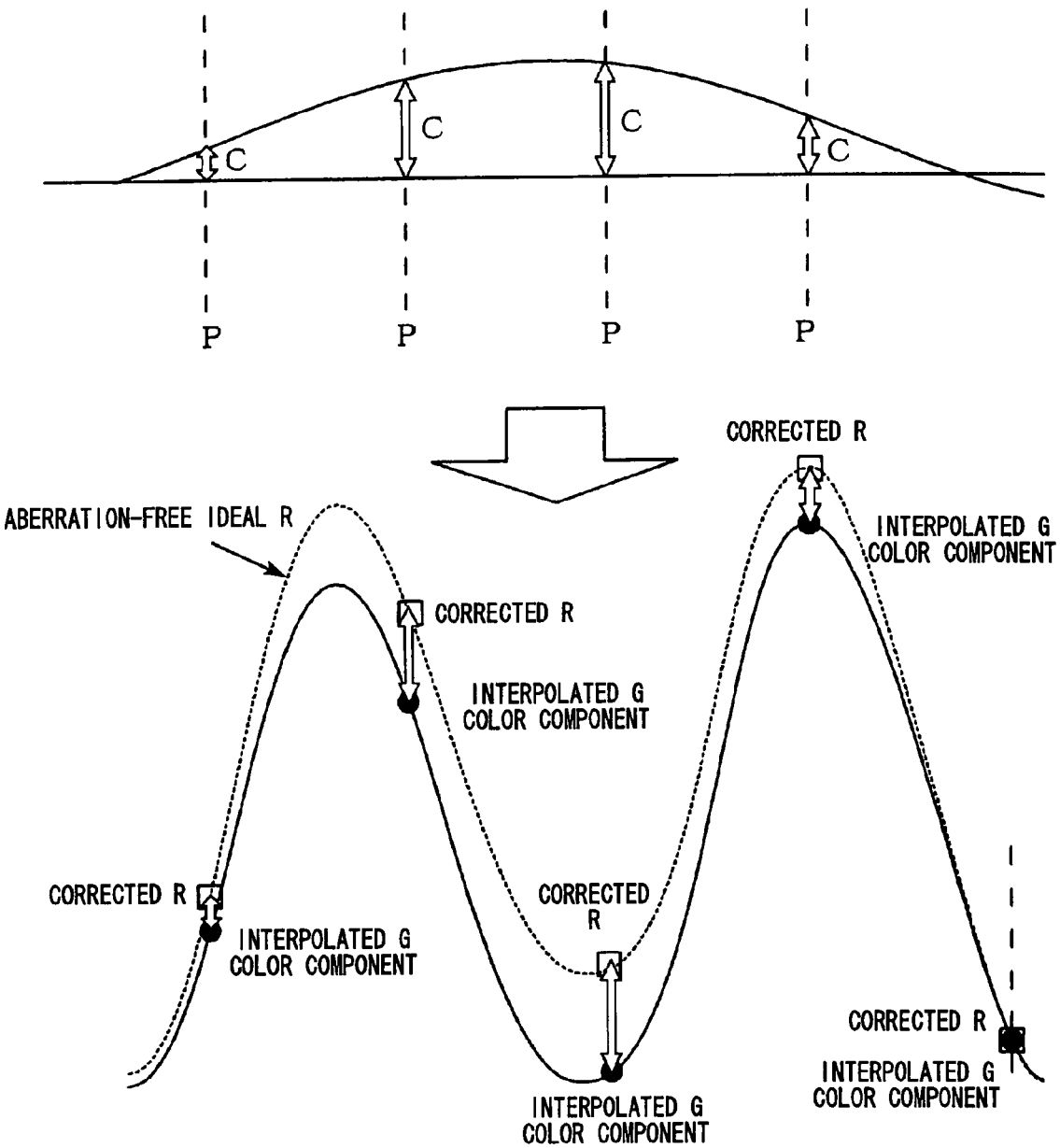
FIG. 11 depicts the processing of obtaining corrected R color components from color difference components C and interpolated G color components.

Step S39: On the other hand, the color difference interpolation unit 33 interpolates the color difference components C''' in the original positions P''' to produce color difference components C in the pixel positions P (see FIG. 11).

Step S40: The RB production unit 34 produces corrected R color components on the basis of the interpolated G color components and the color difference components in the pixel positions P (see FIG. 11). For example, the corrected R color components may be obtained using the following equation.

Corrected R color component=Color difference component C +Interpolated G color component Step S41: The same processing as that performed at steps S33 to S40 is performed for B color components in the raw data to produce corrected B color components.

Step S42: The RB production unit 34 outputs raw data in which the corrected R color components, the corrected B color components, and the G color components are arranged in pixels.

By the above operations, the image processor 51 completes the processing of correction of the magnification chromatic aberration for the raw data.

Step S43: At step S43 and later steps, magnification chromatic aberration correction and color interpolation are performed in parallel. For this reason, the G interpolation unit 31 interpolates G color components in raw data to obtain G color components for all the pixels. It is preferable to perform high precision interpolation using similarity judgment also for correction performed at this step.

Step S44: The color difference interpolation unit 33 interpolates color difference components C''' in the original positions P''' to produce color difference components C for all the pixels.

Step S45: The RB production unit 34 produces corrected R color components of all pixels on the basis of the G color components and the color difference components of all the pixels.

Step S46: The same processing as that performed at steps S33 to S37 and S43 to S45 is performed for B color components in the raw data to produce corrected B color components of all the pixels.

Step S47: The RB production unit 34 output image data having a corrected R color component, a corrected B color component, and a G color component every pixel.

By the above operations, the image processor 51 completes the correction of the magnification chromatic aberration and the color interpolation.

Effect of Second Embodiment, Etc.

Usually, when color difference components are obtained from an image which contains magnification chromatic aberration, many peak-like errors occur on the color difference components due to small positional shifts between color components.

However, in the second embodiment, after the positional shifts of the R color components and the G color components have been removed in advance, color difference components C" are obtained. For this reason, very few peak-like errors occur on the color difference components C", so that color differences can be obtained accurately.

Furthermore, since interpolation values are calculated using G color components existing in high density, correct interpolation values are calculated near a Nyquist frequency to correct the positional shifts accurately, and thereby moire and false color which occur in a Nyquist structure unit when there is a positional shift can be suppressed.

Furthermore, many natural images have a tendency that the upper structures of R, G, and B color components are similar. Thus, when color difference components are produced by differences or ratios between color components, the upper structures of the color difference components have a tendency to become very small as compared with R, G, and B upper structures. For this reason, even if upper structure information is lost to some extent when interpolating the color difference components C" to obtain color difference components C, this hardly affects the final image quality.

In addition, in the second embodiment, corrected R color components are produced by combining the color difference components C after interpolation and the G color components. In this processing, the fine image structures of the G color components are reflected to corrected R color components, so that corrected R color components having fine image structures can be obtained.

This processing has the same effect as the processing of adding structure information extracted from the G color components to roughly corrected R color components to give fine structures to them.

Furthermore, in the second embodiment, similar processing is performed for the B color components. For this reason, raw data which have no positional shift caused by the magnification chromatic aberration and which well preserve image structures can be produced.

In addition, at steps S38 to S42 of the second embodiment, an image in which the magnification chromatic aberration has been corrected is output in the form of raw data. For this reason, in the processing unit (not shown in the figures) in a later stage, correspondence to the raw data is sufficient and the basic processing configuration is not required to be changed regardless of whether the magnification chromatic aberration is corrected or not. As a result, the whole circuit size can be reduced. Furthermore, it becomes possible to maintain the quality of the whole image processing regardless of whether the magnification chromatic aberration is corrected or not.

In addition, color misregistration in a Nyquist frequency structure is also corrected accurately, so that mistakes in similarity judgment at color interpolation performed later and interpolation value calculation errors can be reduced.

On the other hand, at steps S43 to S47 of the second embodiment, magnification chromatic aberration correction and color interpolation can be performed in parallel. As a result, it becomes possible to omit needless arithmetic processing (color difference calculation and the like) more than when magnification chromatic aberration correction and color interpolation are performed separately, so that increase in processing speed and decrease in circuit size can be achieved.

In addition, at steps S35 and S36 of the second embodiment, color difference components C" in the original positions P''' are produced. At that time, pixels coordinates of the original positions P''' are not always integer values, so that it is difficult to record the color difference components C" on an image memory. In such a case, the color difference components C" may be recorded in correspondence with, for example, the pixel positions P instead of in correspondence with the original positions P'''. Assuming this processing, interpretation as described below also becomes possible for processing at steps S35 and S36.

In other words, the positional G components of the original positions P''' are produced by interpolation and the values of the G components are shifted to the pixel positions (stored in the memory at the memory addresses of the pixel positions P, for example). By calculating the differences between the G components of the pixels positions P (reference color components the positions of which are shifted) and the R components of the pixel positions P (color components to be interpolated the positions of which are originally shifted), color difference components C" the positions of which are shifted are produced in the pixel positions P.

Under this interpretation, at steps S39 or step S44, after the color difference components C" in the pixel positions P are shifted to the original positions P''' to correct the positional shifts, correct color difference components C in which positional shifts have been corrected are produced by interpolation with respect to the pixel positions P or all the pixels.

Interpretation as described above seems different from the operation of the second embodiment at first glance, but actually means the same processing.

Supplement to Embodiments

In the second embodiment, the processing of correcting magnification chromatic aberration of a Bayer image is described. However, an object to be processed in the second embodiment is not limited to a Bayer image. For example, it is also possible to process image data produced by a two-plate image-capturing device. In general, when the two-plate image-capturing device is constituted by an image pickup device in which G filters are arranged on the whole surface and an image pickup device in which RB filters are arranged in a checkerboard-like pattern, image data in which either an R component or a B component is lost per pixel is produced. By performing correction of color misregistration like the second embodiment for this kind of image, an effect of compensating for the fine structure information of G components against corrected R and B components can be obtained.

Furthermore, in the embodiments described above, embodiments of an electronic camera (including an image processor) are described. However, the present invention is not limited to them. Processing of raw data described above (see FIGS. 2, 8 and 9) may be performed with a computer (image processing program).

In the embodiments described above, raw data having a Bayer array including R, G, and B color components is described. However, the color components of raw data are not limited to R, G, and B color components. Furthermore, the color arrangement pattern of raw data is not limited to a Bayer array. In general, when the color components of low pixel density in raw data are correction object color components and the color components of high pixel density in the raw data are used as reference color components, the same effect as the embodiments described above can be obtained.

In addition, image processing methods for raw data described above can be provided using an image server (e.g. album server) on the Internet.

Furthermore, in the embodiments described above, correcting color misregistration caused by magnification chromatic aberration is described. However, the present invention is not limited to this. According to the present invention, it is also possible to correct color misregistration caused by a factor other than magnification chromatic aberration.

The present invention can be implemented in other various forms without departing from the spirit or main features of it. For this reason, the embodiments described above are only examples in every aspect, and should not be construed in the sense of limitation. The scope of the present invention is represented by the appended claims, and is not restricted to this specification at all. In addition, all changes and modifications included within a scope equivalent to the scope of the appended claims are within the present invention.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processor, comprising:
an input unit capturing an image data which are represented by two or more kinds of color components including at least correction object color components and reference color components and which have one kind of said color components per pixel;
a color misregistration information acquisition unit acquiring or detecting information about positional shifts of said correction object color components; and
a color misregistration suppression unit correcting positional shifts of said correction object color components on the basis of said information about positional shifts,
wherein said color misregistration suppression unit comprises:
a positional shift correction unit correcting said positional shifts of said correction object color components on the basis of said information about positional shifts;
an image structure extraction unit extracting image structures from said reference color components; and
an image structure compensation unit compensating for image structures lost from said correction object color components due to said positional shift correction with image structures of said reference color components extracted by said image structure extraction unit.

2. The image processor according to claim 1, wherein said image structure extraction unit uses color components of higher pixel density than said correction object color components as said reference color components.

3. The image processor according to claim 1, wherein:
said positional shift correction unit obtains said correction object color components by interpolation with respect to positional shift destinations P' of pixel positions P of said correction object color components to use as correction object color components in said pixel positions P;
said image structure extraction unit obtains reference color components Z1 in said pixel positions P by interpolation, produces reference color components Z2 in said pixel positions P by performing interpolation of reference spacing which is equivalent to pixel spacing which is referred in interpolation of said positional shift correction unit, and extracts a difference between interpolation results Z1 and Z2; and
said image structure compensation unit adds the difference between interpolation results Z1 and Z2 obtained by said image structure extraction unit to said correction object color components in which positional shifts have been corrected by said positional shift correction unit.

4. The image processor according to claim 3, wherein said image structure extraction unit obtains original positions Q before occurrence of said positional shifts with respect to said correction object color components used for interpolation of said positional shift destinations P', interpolates reference color components in said original positions Q, and obtains said reference color components Z2 in said pixel positions P.

5. An image processor, comprising:
an input unit capturing an image which is represented by two or more kinds of color components including at least correction object color components and reference color components and in which at least one kind of said correction object color components per pixel has been lost;
a color misregistration information acquisition unit acquiring or detecting information about positional shifts of said correction object color components; and
a color misregistration suppression unit correcting positional shifts of said correction object color components on the basis of said information about positional shifts,
wherein said color misregistration suppression unit comprises:
a reference color component positional shift unit shifting positions of said reference color components in agreement with positional shifts of said correction object color components on the basis of said information about positional shifts;
a color difference calculation unit obtaining color differences which have been shifted in position on the basis of said reference color components which have been shifted in position by said reference color component positional shift unit and said correction object color components; and
a color difference positional shift correction unit correcting positional shifts of said color differences on the basis of said information about positional shifts.

6. The image processor according to claim 5, wherein said color difference positional shift correction unit corrects positional shifts of color differences in agreement with pixel positions of said reference color components which have not been shifted by said reference color component positional shift unit.

7. An image processor, comprising:

an input unit capturing an image which is represented by two or more kinds of color components including at least correction object color components and reference color components and in which at least one kind of said correction object color components per pixel has been lost;

a color misregistration information acquisition unit acquiring or detecting information about positional shifts of said correction object color components; and a color misregistration suppression unit correcting positional shifts of said correction object color components on the basis of said information about positional shifts, wherein said color misregistration suppression unit comprises:

a reference color component interpolation unit obtaining original positions P''' before occurrence of said positional shifts with respect to pixel positions P of said correction object color components on the basis of said information about positional shifts and producing reference color components in said original positions P''' by interpolation;

a color difference calculation unit obtaining color difference components C''' in said original positions P''' from correction object color components in said pixel positions P and reference color components in said original positions P'''; and a color difference interpolation unit obtaining at least color difference components C in pixel positions P by interpolating color difference components C''' in said original positions P'''.

8. The image processor according to claim 7, wherein said color misregistration suppression unit comprises:

a correction object color component production unit producing reference color components in pixel positions P by interpolation and producing correction object color components in pixel positions P on the basis of reference color components and color difference components C in pixel positions P.

9. The image processor according to claim 7, wherein said color misregistration suppression unit interpolates color difference components C''' in said original positions P''', obtains color difference components C for pixel positions of reference color components, and produces correction object color components for pixel positions of reference color components on the basis of color difference components C and reference color components.

10. An image processor, comprising:

an input unit capturing an image which is represented by two or more kinds of color components including at least correction object color components and reference color components and which has one kind of said color components per pixel;

a color misregistration information acquisition unit acquiring or detecting information about positional shifts of said correction object color components; and a color misregistration suppression unit correcting positional shifts of said correction object color components on the basis of said information about positional shifts, wherein said color misregistration suppression unit corrects color misregistration of said correction object color components on the basis of said reference color components and said correction object color components, and produces image data in which correction object color components in which color misregistration has been corrected and said reference color components are arranged in pixels and one kind of said color components is arranged per pixel.

11. An image processing program embodied on a non-transitory computer readable storage medium, allowing a computer to function as the image processor according to claim 1.

12. An electronic camera comprising:

the image processor according to claim 1; and an image-capturing unit capturing an image of a subject and producing image data in which each pixel has one color component, wherein said image processor processes said image data produced by said image-capturing unit to correct color misregistration.

13. An image processing method, comprising:

an input step of capturing an image which is represented by two or more kinds of color components including at least correction object color components and reference color components and which has one kind of said color components per pixel;

a color misregistration information acquisition step of acquiring or detecting information about positional shifts of said correction object color components; and a color misregistration suppression step of correcting positional shifts of said correction object color components on the basis of said information about positional shifts, wherein said color misregistration suppression step comprises:

a positional shift correction step of correcting said positional shifts of said correction object color components on the basis of said information about positional shifts;

an image structure extraction step of extracting image structures from said reference color components; and an image structure compensation step of compensating for image structures lost from said correction object color components due to said positional shift correction with image structures of said reference color components extracted by said image structure extraction unit.

14. An image processing method, comprising:

an input step of capturing an image which is represented by two or more kinds of color components including at least correction object color components and reference color components and in which at least one kind of said correction object color components per pixel has been lost;

a color misregistration information acquisition step of acquiring or detecting information about positional shifts of said correction object color components; and a color misregistration suppression step of correcting positional shifts of said correction object color components on the basis of said information about positional shifts, wherein said color misregistration suppression step comprises:

a reference color component interpolation step of obtaining original positions P''' before occurrence of said positional shifts with respect to pixel positions P of said correction object color components on the basis of said information about positional shifts and producing reference color components in said original positions P''' by interpolation;

a color difference calculation step of obtaining color difference components C''' in said original positions P''' from correction object color components in said pixel positions P and reference color components in said original positions P'''; and a color difference interpolation step of obtaining at least color difference components C in pixel positions P by interpolating color difference components C''' in said original positions P'''.

15. The image processor according to claim 2, wherein:
said positional shift correction unit obtains said correction object color components by interpolation with respect to positional shift destinations P' of pixel positions P of said correction object color components to use as correction object color components in said pixel positions P;

said image structure extraction unit obtains reference color components Z1 in said pixel positions P by interpolation, produces reference color components Z2 in said pixel positions P by performing interpolation of reference spacing which is equivalent to pixel spacing which is referred in interpolation of said positional shift correction unit, and extracts a difference between interpolation results Z1 and Z2; and said image structure compensation unit adds the interpolation results Z1 and Z2 obtained by said image structure extraction unit to said correction object color components in which positional shifts have been corrected by said positional shift correction unit.

16. A non-transitory computer readable medium comprising computer readable code to implement a function on at least one processing device as the image processor according to claim 5.

17. A non-transitory computer readable medium comprising computer readable code to implement a function on at least one processing device as the image processor according to claim 7.

18. A computer readable medium comprising computer readable code to implement a function as the image processor according to claim 10.

19. An electronic camera comprising:
the image processor according to claim 5; and
an image-capturing unit capturing an image of a subject and producing image data in which each pixel has one color component,
wherein said image processor processes said image data produced by said image-capturing unit to correct color misregistration.

20. An electronic camera comprising:
the image processor according to claim 7; and
an image-capturing unit capturing an image of a subject and producing image data in which each pixel has one color component,
wherein said image processor processes said image data produced by said image-capturing unit to correct color misregistration.

21. An electronic camera comprising:
the image processor according to claim 10; and
an image-capturing unit capturing an image of a subject and producing image data in which each pixel has one color component,
wherein said image processor processes said image data produced by said image-capturing unit to correct color misregistration.

* * * * *